United States Patent [19]

Nakagawa

[11] 4,128,848
[45] Dec. 5, 1978

[54] AUTOMATIC GHOST-SUPPRESSION SYSTEM

[75] Inventor: Isao Nakagawa, Yokohama, Japan
[73] Assignee: Hitachi, Ltd., Tokyo, Japan
[21] Appl. No.: 735,029
[22] Filed: Oct. 22, 1976
[51] Int. Cl.² .................. H04N 5/14; H04B 1/10; H03K 1/12
[52] U.S. Cl. ................... 358/167; 358/905; 325/476; 307/262
[58] Field of Search ............ 358/36, 167, 905, 27; 325/473–476; 330/254; 307/228, 262

[56] References Cited

U.S. PATENT DOCUMENTS

| | | | |
|---|---|---|---|
| 2,236,134 | 3/1941 | Gloess | 358/905 X |
| 3,521,177 | 7/1970 | Niet | 358/167 X |
| 3,935,536 | 1/1976 | Kimura et al. | 358/167 X |
| 3,988,775 | 10/1976 | Nakagawa et al. | 358/167 X |
| 4,012,643 | 3/1977 | Miura | 358/167 X |
| 4,013,834 | 3/1977 | Kino et al. | 358/167 |
| 4,047,224 | 9/1977 | Yamaguti | 358/905 X |
| 4,053,932 | 10/1977 | Yamaguti et al. | 358/905 X |

*Primary Examiner*—Robert L. Griffin
*Assistant Examiner*—Aristotelis M. Psitos
*Attorney, Agent, or Firm*—Craig and Antonelli

[57] ABSTRACT

An automatic ghost-suppression system having an adder, a variable delay device, and a polarity and gain control device. The variable delay device is connected with the adder through the polarity and gain control device. A video signal is simultaneously applied to both the adder and the variable delay device, and added in the adder to the video signal which is delayed by the variable delay device and then preferably adjusted in its polarity and amplitude by the polarity and gain control device. On the other hand, a synchronizing signal is separated from the delayed video signal and used for generation of a gate signal for detecting a residual ghost during a vertical blanking period. From the video signal produced at the output of the adder, the residual ghost contained in the vertical blanking period is detected by the gate signal and used as a control signal for controlling the polarity and gain control device thereby to automatically suppress the ghost.

10 Claims, 16 Drawing Figures

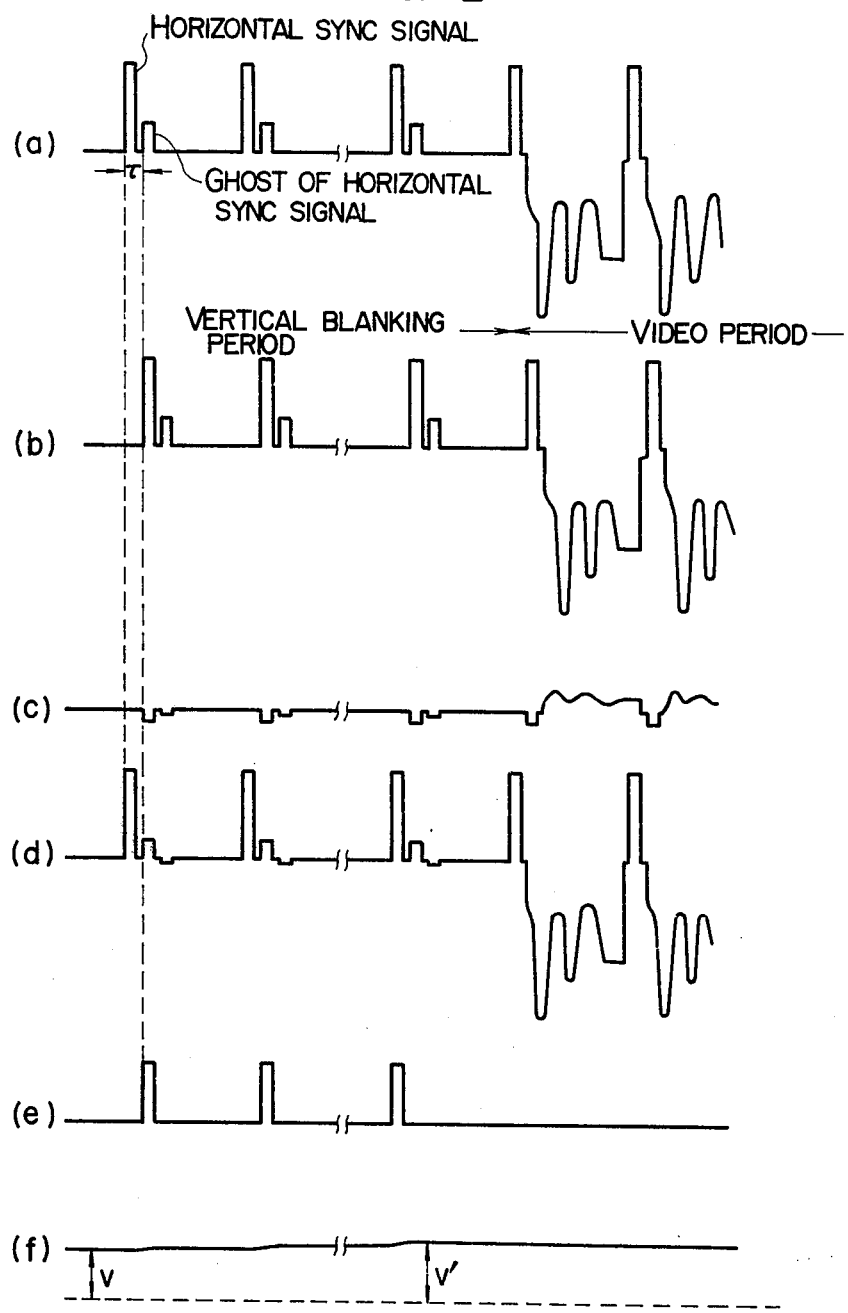

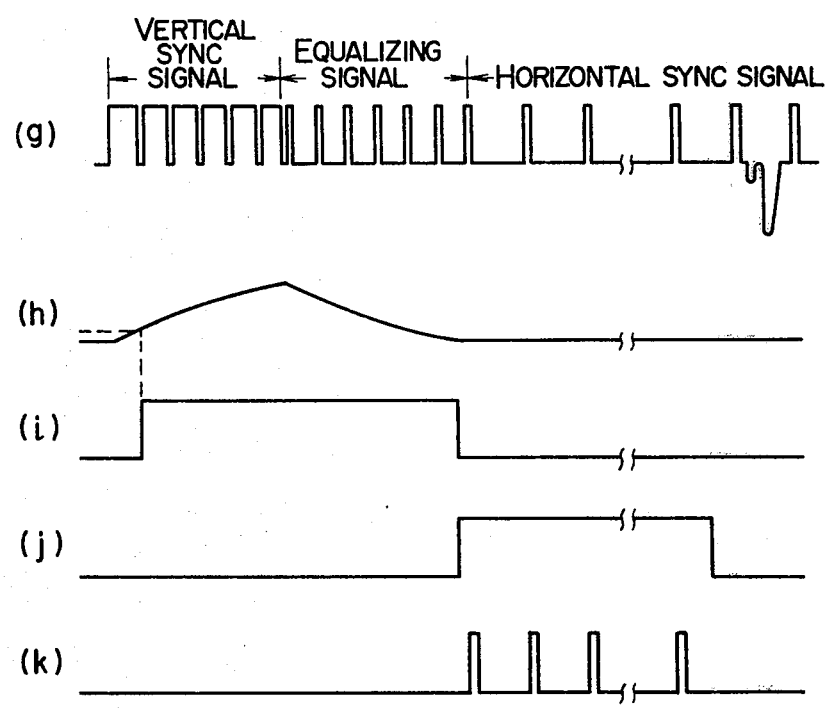

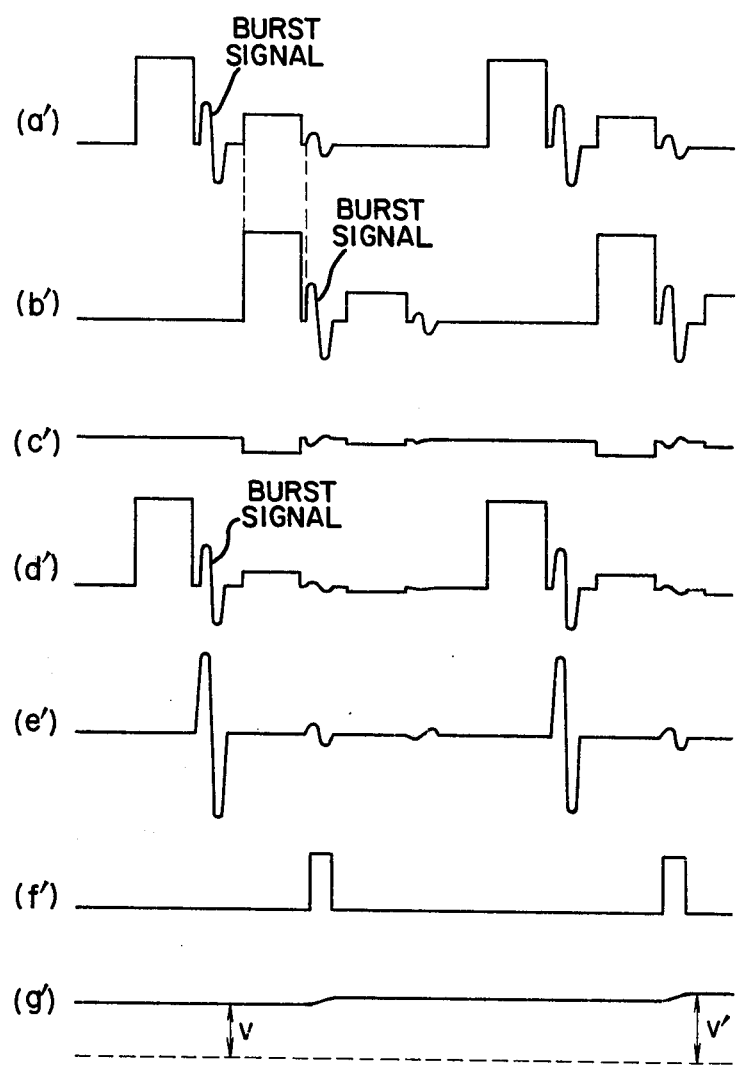

AUTOMATIC GHOST-SUPPRESSION SYSTEM

BACKGROUND OF THE INVENTION

1. Field of the Invention

This invention relates to an automatic ghost-suppression system for use in a television receiver or more particularly to an automatic ghost-suppression system in which a ghost contained in a vertical blanking period of a video signal is detected by means of adding the video signal directly applied to an adder and the video signal applied to the adder through a variable delay device and a polarity and gain control device (hereinafter referred to as a ghost-suppression signal), and the detected ghost is used as a control signal for automatically controlling the polarity and gain control device.

2. Description of the Prior Art

A conventional ghost-suppression system for use in a television receiver is well known in which part of a demodulated receiving signal (a video signal) is delayed and adjusted in its polarity and amplitude so as to permit a ghost contained in the video signal to be offset when its delayed part is added to the video signal thereby to suppress the ghost. In such a system, the delay time and the polarity and amplitude of the delayed signal are required to be adjusted. Those adjustments are currently performed manually, often resulting in an incomplete adjustment. In addition, it is very difficult to improve the condition of incomplete adjustment because of the fact that it cannot be seen from the screen which adjustment for polarity or gain is needed.

SUMMARY OF THE INVENTION

Accordingly, it is an object of the present invention to provide a novel and useful automatic ghost-suppression system.

Another object of the invention is to provide an automatic ghost-suppression system in which the gain of a polarity and gain control device for adjusting the amplitude of a ghost-suppression signal is automatically controlled.

A further object of the invention is to provide an automatic ghost-suppression system in which a residual ghost in a vertical blanking period contained in the output of an adder for adding a video signal to the ghost-suppression signal is detected and used as a control signal for controlling the amplitude of the ghost-suppression signal.

In order to achieve the objects of the present invention, there is provided an automatic ghost-suppression system comprising a variable delay device adapted to delay the video signal according to the delay time of a ghost, a polarity and gain control device adapted to adjust the amplitude of the video signal delayed by the variable delay device, an adder for adding the video signal delayed and adjusted in its polarity and amplitude by the polarity and gain control device and a video signal not delayed and for producing a video signal with the suppressed ghost, a synchronizing signal separator for separating a synchronizing signal from the delayed video signal, a gate signal generator for generating a gate signal for sampling the residual ghost in the vertical blanking period out of the video signal produced from the adder, in response to the synchronizing signal separated by the synchronizing signal separator, a detector for detecting the residual ghost in the vertical blanking period contained in the video signal produced from the adder, in response to the gate signal generated by the gate signal generator, and means for controlling the polarity and gain of the polarity and gain control device in response to the output signal of the detector.

BRIEF DESCRIPTION OF THE DRAWINGS

FIG. 2 shows waveforms produced at the essential parts of the system according to the invention for explaining the block diagram in FIG. 1.

FIG. 4 shows waveforms produced at the essential parts of the system according to the invention for explaining the block diagram of FIG. 3.

FIG. 11 shows waveforms produced at the essential parts of the system according to the invention for explaining the block diagram of FIG. 10.

DESCRIPTION OF THE PREFERRED EMBODIMENTS

Figure 1:
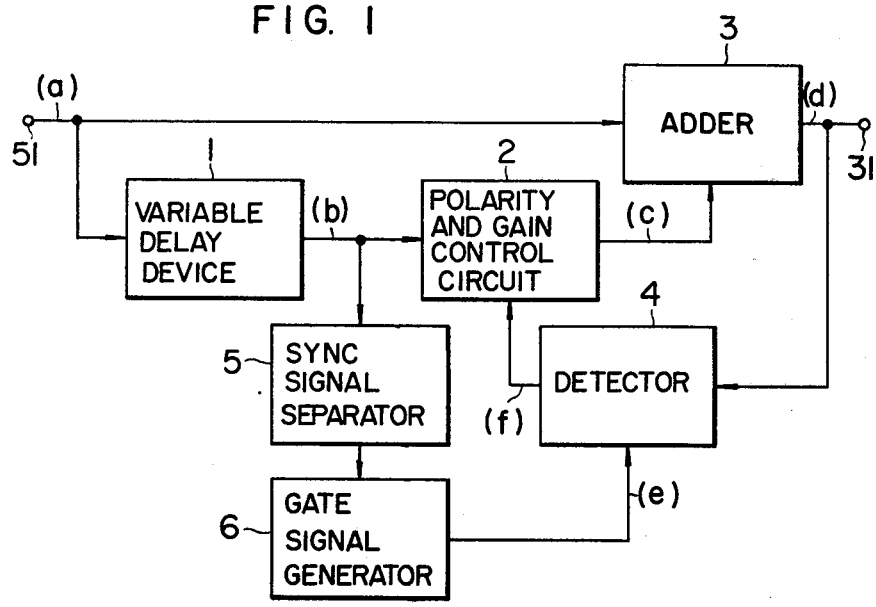
FIG. 1 is a block diagram showing an embodiment of the automatic ghost-suppression system according to the present invention.

An embodiment of the automatic ghost-suppression system according to the present invention as applied to the feed-forward type ghost-suppression system is shown in the block diagram of FIG. 1. In this drawing, reference numeral 51 designates an input terminal to which a received signal is applied. Numeral 1 designates a variable delay device for delaying the received signal, such as a charge transfer device (CTD). Numeral 2 designates a polarity and gain control device for adjusting the polarity and amplitude of the signal delayed by the variable delay device 1. Numeral 3 an adder for adding the signal whose polarity and amplitude have been adjusted by the polarity and gain control device 2, with the received signal obtained at the input terminal 51. Numeral 4 designates a detector for detecting the residual ghost contained in the output signal of the adder 3. Numeral 5 designates a sync signal separator for separating a sync signal from the signal delayed by the variable delay device 2. Numeral 6 designates a gate signal generator for generating a gate signal used for sampling the horizontal sync pulses of the ghost contained in the vertical blanking period in response to the sync signal separated by the sync signal separator 5.

In the embodiment of the invention shown in FIG. 1, the variable delay device 1, the polarity and gain control device 2 and the adder 3 make up a ghost-suppression section of the automatic ghost-suppression system, while the detector 4, the sync signal separator 5 and the gate signal generator 6 constitute a control signal generator section for automatically controlling the polarity and amplitude of the ghost-suppression signal. If the polarity and amplitude of the delayed received signal are to be controlled automatically for the purpose of suppressing the ghost, the principle is to detect the residual ghost and to use the detected signal to control the polarity and amplitude of the delayed received signal in such a manner as to eliminate the ghost. The stable operation for this purpose, however, requires a detection signal not related to the picture information itself. This purpose is achieved by utilizing the residual horizontal sync pulse of the ghost. During the video period, however, the horizontal sync pulse of the ghost is overshadowed by the video signal and therefore cannot be sampled properly. During the vertical blanking period lacking any other signal, by contrast, the horizontal sync pulse of the ghost presents itself and therefore can be sampled properly. According to the present invention, the residual horizontal sync pulse of the ghost during the vertical blanking period is detected to obtain a control signal.

The operation of the automatic ghost-suppression system shown in FIG. 1 will be explained below with reference to the waveforms produced at the parts of thereof as shown in FIG. 2. A signal containing the ghost as shown in (a) of FIG. 2 is assumed to be applied to the terminal 51 of FIG. 1. The signal (a) of FIG. 2 is related to the case where the ghost occurs with the delay time of $\tau$ which is longer than 5 $\mu$sec to avoid the superimposition of the horizontal sync pulse of the ghost on that of the signal to be received. As the result of adjusting the delay time of the variable delay device 1 at $\tau$ while viewing the television receiver screen, the output as shown in (b) of FIG. 2 is produced from the variable delay device 1. Assume that the polarity and gain control device 2 is in such a condition that the delayed signal has a polarity and an amplitude as shown in (c) of FIG. 2. The signal (a) of FIG. 2 and the signal (c) of FIG. 2 are added with each other in the adder 3, so that the adder 3 produces at its output terminal 31 a signal with the ghost not satisfactorily eliminated, as shown in (d) of FIG. 2.

To improve this situation, a gate signal is generated for sampling the residual ghost of the horizontal sync pulse in the vertical blanking period, as shown in (e) of FIG. 2, by the sync signal separator 5 and the gate signal generator 6. This gate signal is used to detect the residual ghost contained in the signal (d) of FIG. 2, and the resulting detection signal is again used to control the polarity and amplitude of the polarity and gain control device 2, thus eliminating the residual ghost. When the waveforms as shown in FIG. 2 are involved, for example, the control voltage is raised from V to V', while the output of the polarity and gain control device 2 is increased even more. In this way, the control voltage continues to be increased until it is maintained constant upon successful elimination of ghost.

Figure 3:
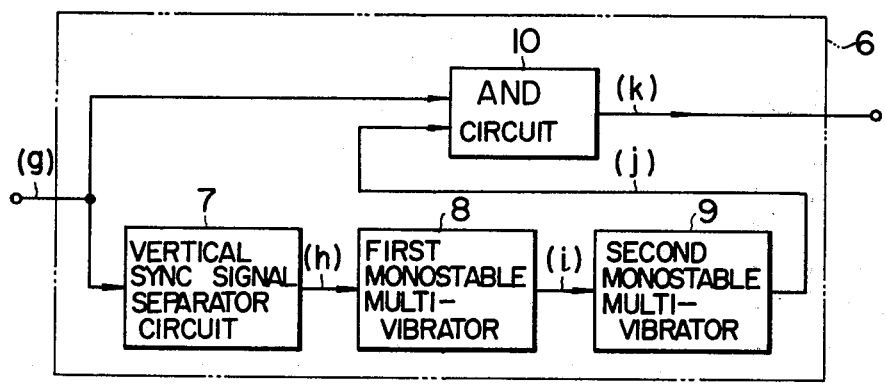
FIG. 3 is a block diagram of the gate signal generating device used in the circuit of FIG. 1.

The gate signal generator 6 for producing a signal for sampling the ghost component of the horizontal sync pulse in the vertical blanking period will be explained with reference to FIG. 3. In FIG. 3, reference numeral 7 shows a vertical sync signal separator circuit for separating the vertical sync signal further from the sync signal separated in the sync signal separator 5. Numeral 8 designates a first monostable multivibrator energized at the time point when the output of the vertical sync signal separator circuit 7 exceeds a predetermined level. Numeral 9 designates a second monostable multivibrator energized at the fall of the output of the monostable multivibrator 8. Numeral 10 designates an AND circuit with the inputs thereof including the output signal from the second monostable multivibrator 9 and the original separated sync signal.

The operation of the gate signal generator 6 will be explained with reference to the waveforms shown in FIG. 4 which are produced at the various parts of the automatic ghost-suppression system. The separated sync signal as shown in (g) of FIG. 4 without any ghost is applied to the gate signal generator 6. In other words, the sync signal separator 5 preceding to the gate signal generator 6 is energized in response to the voltage of the sync signal greater than the threshold level, like an ordinary sync signal separator, and therefore fails to respond to a ghost signal with a small amplitude, so that any ghost component is not included in the output signal of the sync signal separator 5. Part of this signal from the sinc signal separator 5 is applied to the veritcal sync signal separator circuit 7 where it is low-pass filtered into the vertical sync signal as shown in (h) of FIG. 4.

When the output signal of the vertical sync signal separator circuit 7 exceeds a predetermined level, the first monostable multivibrator 8 is turned on. The operating time of the first monostable multivibrator circuit 8 is required to be not shorter than the duration of the vertical sync signal. The example of (i) of FIG. 4 shows the case in which the operating time of the circuit 8 continues till the end of the duration of the equalizing signal. At the time of fall of the signal from the first monostable multivibrator 8, the second monostable multivibrator 9 starts its operation, and ends its operation before the start of the video period as shown in (j) of FIG. 4. By applying the signals (g) and (j) of FIG. 4 to the AND circuit 10 in FIG. 3, the horizontal sync pulse for the vertical blanking period as shown in (k) of FIG. 4 is separated. This is regardless to whether equalizing pulses are actually included or not. The horizontal sync pulses shown in (k) of FIG. 4 are those that have been delayed by the variable delay device 1 and, as easily seen from (a) and (b) of FIG. 2, their positions coincide with those of the ghost component of the horizontal sync pulses of the original signal. The signal (k) of FIG. 4, therefore, is apparently usable as the signal (e) of FIG. 2 directly for detecting the residual ghost.

In the case where the delay time of the ghost is shorter than 5 $\mu$sec, however, the horizontal sync pulses of the signal to be received and those of the ghost are overlapped. The direct use of the gate signal produced from the device of FIG. 3, therefore, causes part of the horizontal sync pulses of the signal to be received to be undesirably detected, resulting in an erroneous operation. In such a case, therefore, it is necessary to use only the back porch of the gate signal obtained from the device of FIG. 3. A block diagram of the gate signal generator used in such a case is shown in FIG. 5.

Figure 5:
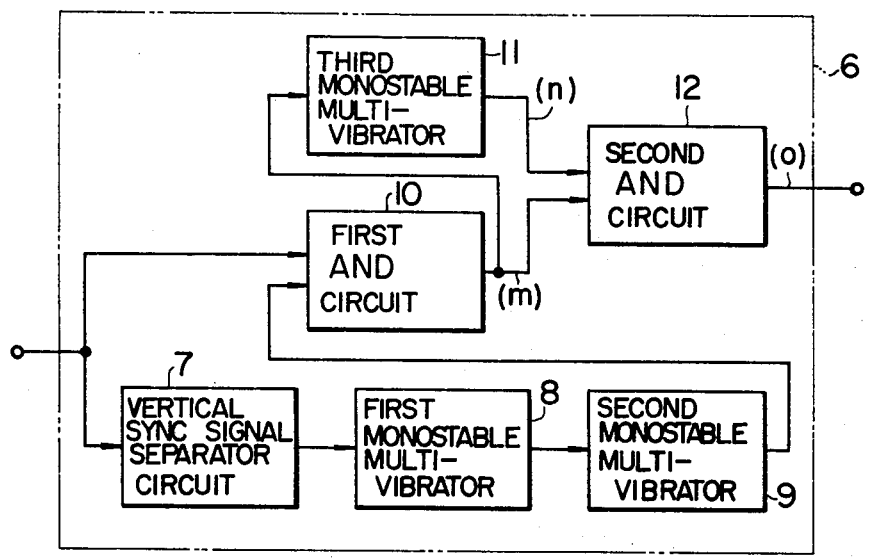
FIG. 5 is a block diagram showing another embodiment of the gate signal generating device used in the circuit of FIG. 1.

The gate signal generator shown in FIG. 5 includes, in addition to the circuit components of the circuit of FIG. 3, a third monostable multivibrator 11 and an AND circuit 12 impressed with the outputs from the first AND circuit 10 and the third nonostable multivibrator 11. The operation of the circuit shown in FIG. 5 will be explained with reference to FIG. 6.

Figure 6:
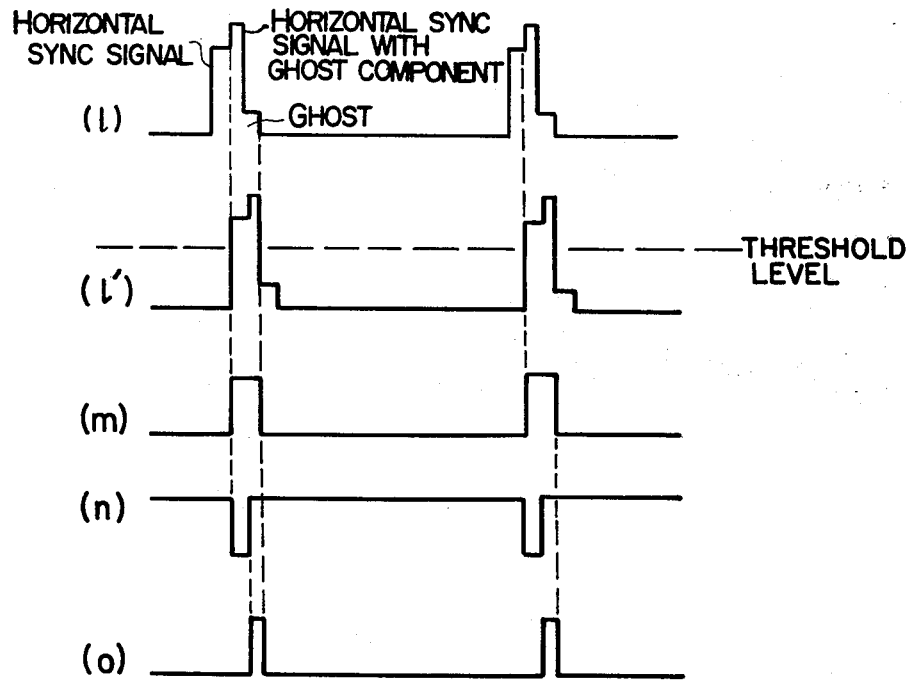
FIG. 6 shows waveforms produced at the essential parts of the system according to the invention for explaining the block diagram of FIG. 5.

Assume that the applied signal is such that the ghost with the delay time of less than 5 μsec is superimposed thereon as shown in (l) of FIG. 6. The signal (l) of FIG. 6 is delayed only by the delay time of the ghost caused by the variable delay device 1, and the output as shown in (l') of FIG. 6 is produced from the variable delay device 1. The sync signal separator 5 is energized in response to the voltage of a sync signal greater than a threshold level, and therefore fails to respond to a ghost signal. Therefore, the signal as shown in (g) of FIG. 4 whose wave form is the same as that of the signal (m) of FIG. 6 is applied to the input terminal of the gate signal generator. The AND circuit 10 thus produces at its output terminal a signal as shown in (m) of FIG. 6 which is delayed only by the delay time of the ghost caused by the variable delay device 1. If this signal is used directly as a gate signal, the horizontal sync pulses of the signal to be received are undesirably detected as easily seen from (l) and (m) of FIG. 6. By contrast, if the signal (m) of FIG. 6 is applied to the third monostable multivibrator 11 and, in addition, the third monostable multivibrator 11 is so constructed as to be actuated in response to the input signal (m) of FIG. 6 and at the same time to regain the original state in less than 5 μsec, then the signal as shown in (n) of FIG. 6 is produced. By applying the signals (m) and (n) of FIG. 6 to the second AND circuit 12, the signal as shown in (o) of FIG. 6 is obtained. In this way, it is possible to produce a gate signal capable of detecting the ghost without the horizontal sync signal superimposed thereon. By the way, the circuit of FIG. 5 is able to detect part of the horizontal sync signal of the ghost and therefore may be used also in the case of a ghost of 5 μsec or longer.

As will be seen from FIG. 2, the pedestal level provides a reference for detecting the horizontal sync pulses of the ghost. This pedestal level has a difference in DC level with the average value of the signal, which DC level difference is undergoing a constant change. To fix this pedestal level by any means is therefore necessary. There are a couple of such means. One is to clamp the peak value of the sync signal, and the other is to clamp the back porch of the horizontal sync signal. By the former method, it is impossible to fix the pedestal level at a constant value, since the height of the sync pulses are not constant. The trouble with the latter method, on the other hand, is that, as will be easily seen from the signal (l) of FIG. 6, the horizontal sync pulses of the ghost may be superimposed on the back porch and therefore a proper pedestal level cannot be fixed depending on the appearance of the ghost. It is therefore necessary to conceive a new method for fixing the pedestal level not affected by the appearance of the ghost or information.

Figure 7:
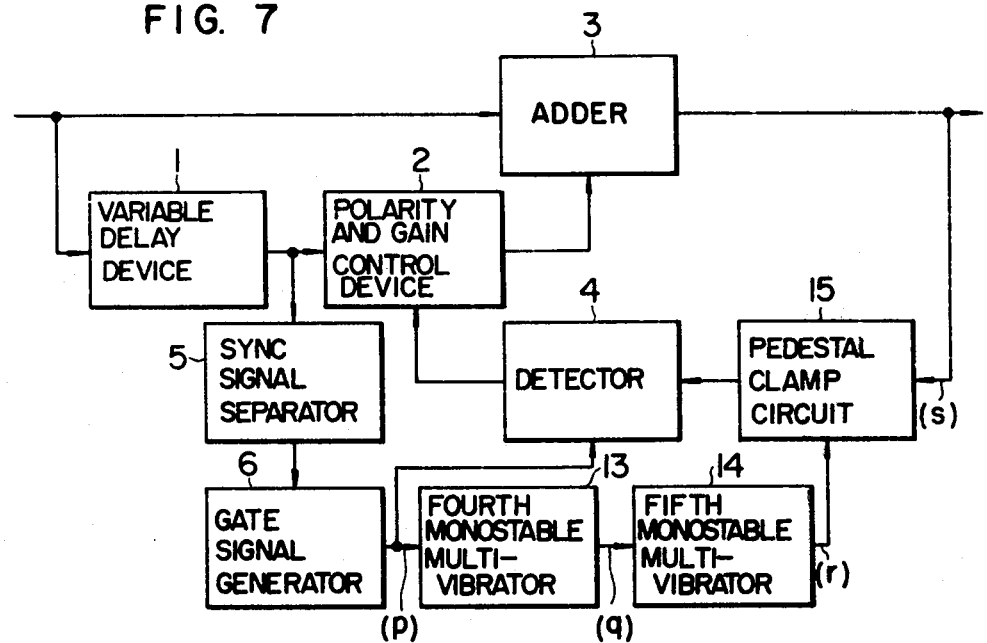
FIG. 7 is a block diagram showing another embodiment of the automatic ghost-suppression system according to the present invention.

An embodiment of a device achieving such an object is shown in FIG. 7. The device of FIG. 7 includes, in addition to the component elements of the circuit of FIG. 1, a circuit for pedestal clamp, which in turn includes a fourth monostable multivibrator 13, a fifth monostable multivibrator 14 and a pedestal clamp circuit 15.

The feature of this device is that, by utilizing the gate signal for detecting the horizontal sync pulses of the ghost, the pedestal section without any horizontal sync pulses of the ghost is clamped at a predetermined potential during the vertical blanking period. As will ge seen from (a) of FIG. 2, this pedestal section without any horizontal sync pulses of the ghost has a proper pedestal level which provides a reference for detecting the horizontal sync pulses of the ghost.

The operation of the fourth and fifth monostable multivibrators 13 and 14 respectively shown in FIG. 7 will be explained below with reference to FIG. 8.

Figure 8:
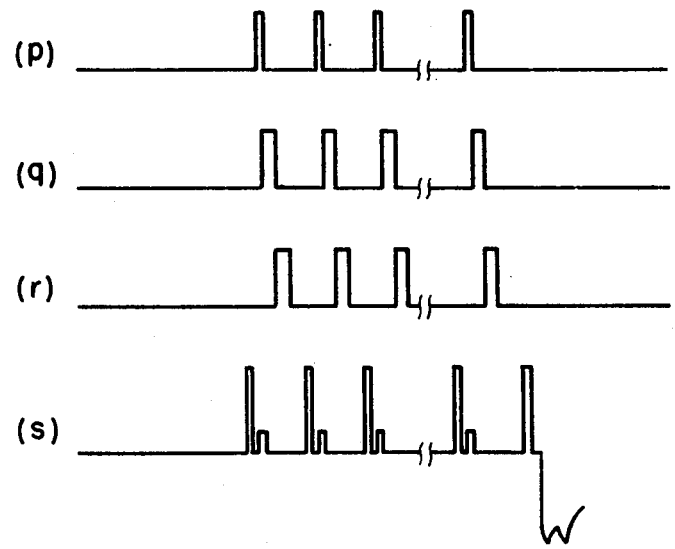
FIG. 8 shows waveforms produced at the essential parts of the system according to the invention for explaining the block diagram of FIG. 7.

The fourth monostable multivibrator 13 begins to be turned on with the fall of the output pulse shown in (p) of FIG. 8 of the gate signal generator circuit 6, and produces an output as shown in (q) of FIG. 8. The fifth monostable multivibrator 14, on the other hand, begins to be turned on with the fall of the output pulse of the fourth monostable multivibrator 13, and produces an output as shown in (r) of FIG. 8. By the use of the output pulse of the fifth monostable multivibrator 14, the pedestal level of the input signal to the pedestal level clamp circuit 15 as shown in (s) of FIG. 8 is clamped at a fixed potential level in the pedestal level clamp circuit, so that a proper pedestal level is clamped without regard to the picture information or the appearance of the ghost.

Therefore, the signal taken out of the pedestal level clamp circuit 15 has an information signal such as the synchronizing signal and ghost superposed on the fixed potential level.

Figure 9:
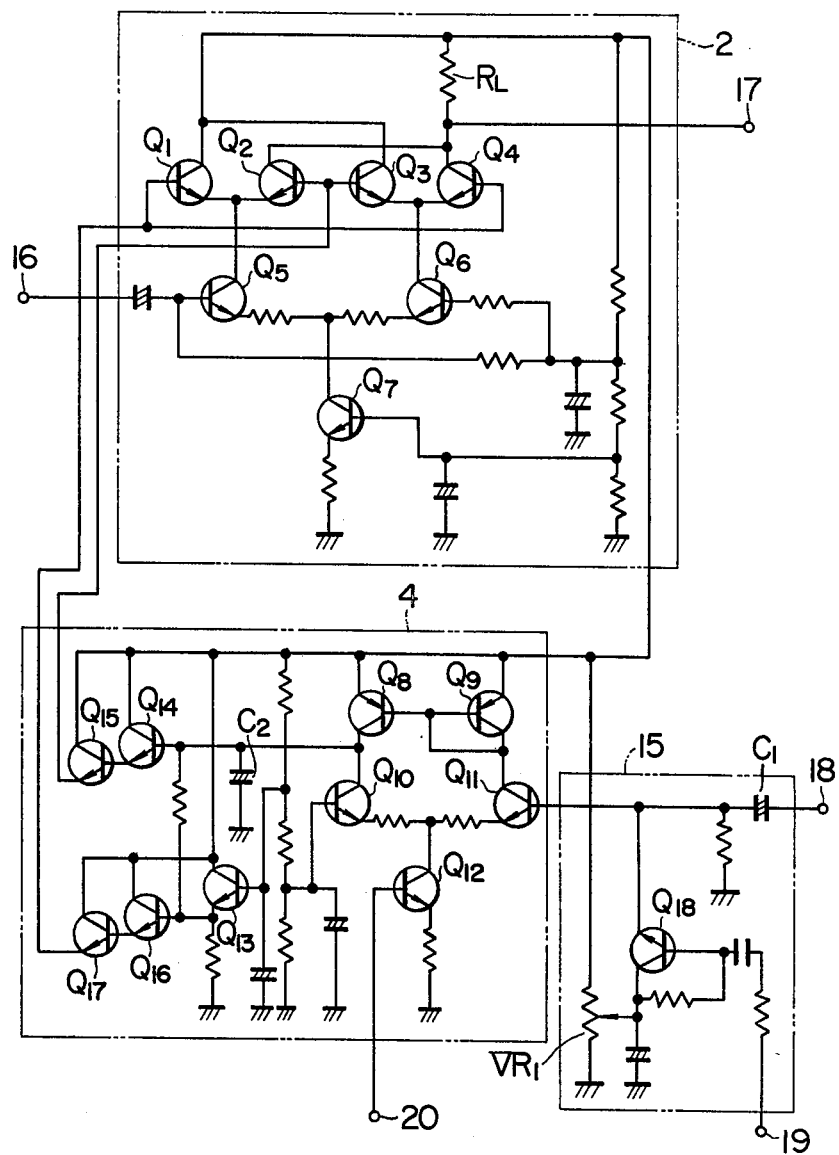
FIG. 9 is a circuit diagram showing the polarity and gain control device, the detector and a pedestal clamp circuit used in the system according to the invention.

An example of the circuit configuration including the polarity and gain control device 2, the detector 4 and the pedestal clamp circuit 15 which make up the most important parts of the above-mentioned device is shown in FIG. 9.

In FIG. 9, transistors $Q_1$ to $Q_7$ make up the polarity and gain control device 2; transistors $Q_8$ to $Q_{17}$ the dectector 4; and the transistor $Q_{18}$ the pedestal clamp circuit 15. Numeral 18 shows an input terminal to the pedestal clamp circuit 15, numeral 19 a gate input terminal for the pedestal clamp circuit 15, and numeral 20 a gate signal input terminal for the detector 4. The transistors $Q_1$ to $Q_7$ make up a fully-balanced type differential amplifier, while the transistor $Q_7$ is for providing a constant current source. In accordance with the magnitude of the DC voltage at the bases of the transistors $Q_1$, $Q_4$; and $Q_2$, $Q_3$, the polarity of the input signal of the polarity and gain control device 2 applied from the terminal 16 is controlled, so that the magnitude of the input signal of the polarity and gain control device 2 is controlled and produced at the terminal 17.

The transistor $Q_{12}$ is a gating transistor turned on at a high output level of the gate signal generator 6. The transistor $Q_{13}$ is provided for setting a reference DC level of the output of the detector 4. The output terminals of the transistors $Q_{14}$, $Q_{15}$; and $Q_{16}$, $Q_{17}$ respectively in Darlington pair are connected to the transistors $Q_2$, $Q_3$; and $Q_1$, $Q_4$ of the polarity and gain control device 2, respectively, thereby controlling the device 2.

The circuit of FIG. 9 will be explained in detail below.

In the pedestal clamp circuit 15, the output from the fifth monostable multivibrator 14 is applied to the transistor $Q_{18}$ from the gate signal input terminal 19. The output pulses of the fifth monostable multivibrator 14 take the form as shown in (r) of FIG. 8 and are so selected as to rise in positions lacking the ghost. When the signal (s) of FIG. 8 applied to the input terminal 18 from the adder 3 is in the pedestal, the transistor $Q_{18}$ is sufficiently saturated, so that the capacitor $C_1$ is charged in such a manner that the emitter side of the transistor $Q_{18}$ becomes equal in potential to the collector side thereof. Regardless of the signal from the adder 3, therefore, the DC level of the pedestal is clamped at a fixed level, with the result that the signal applied to the detector 4 from the pedestal clamp circuit 15 has an information signal such as the synchronizing signal and ghost superposed on the pedestal level clamped at a fixed level.

In the detector 4, upon application of the pulse (o) of FIG. 6 from the second AND circuit shown in FIG. 5 to the gate signal input terminal 20, the transistor $Q_{12}$ is turned on. The differential amplifier pair including the transistors $Q_{10}$ and $Q_{11}$ is kept turned on only for the period of time when the output of the pedestal clamp circuit 15 includes a ghost. Let the current flowing in the transistor $Q_{11}$ be $i_{11}$, and the current $i_{11}$ flows in the transistor $Q_9$, so that the voltage between the base and emitter of the transistor $Q_9$ assumes a value required for that current flow. Since the base of the transistor $Q_8$ is connected to the base of the transistor $Q_9$, the base-emitter voltage of the transistor $Q_8$ also assumes a value equal to that of the transistor $Q_9$. As a result, the same current $i_{11}$ flows in the transistor $Q_8$ as in the transistor $Q_{11}$.

On the other hand, let the currents flowing in the transistors $Q_{10}$ and $Q_{12}$ be $i_{10}$ and $i_{12}$ respectively. The relation $$i_{10} = i_{12} - i_{11} \tag{1}$$

is established. Let the pulse width of the output of the second AND circuit 12 be T, and then the charges in the amount of $(i_{11} - i_{10}) \times T$ flow into the capacitor $C_2$ in response to one pulse.

The clamp level of the pedestal clamp circuit 15 is adjusted by the use of a variable resistor VR1, so that the base potential of the transistor $Q_{11}$ corresponding to the pedestal level is equal to the base potential of the transistor $Q_{10}$. In the absence of the ghost, when the transistor $Q_{12}$ is on, the transistors $Q_{11}$ and $Q_{10}$ have the same base potential, with the result that the current expressed below flows in the transistors $Q_{10}$ and $Q_{11}$.

$$i_{11} = i_{10} = i_{12}/2 \tag{2}$$

As a consequence, the charges flowing into the capacitor $C_2$ are zero, so that the voltage across the capacitor $C_2$ is equal to the emitter voltage of the transistor $Q_{13}$ of the constant voltage source. So, the emitter voltage of transistor $Q_{15}$ becomes equal to that of the transistor $Q_{17}$.

Refernce is made to the case involving the ghost in phase with the signal to be received as shown in (a) of FIG. 1. When the transistor $Q_{12}$ is on, the base potential of the transistor $Q_{11}$ is increased by the amount of the ghost. The result is that $i_{11} > (i_{12}/2)$ and therefore $i_{10} < (i_{12}/2)$. The charges $(i_{11} - i_{10}) \times T > 0$ flow into the capacitor $C_2$, the voltage across which is thereby increased, so that the emitter voltage of the transistor $Q_{15}$ becomes higher than that of the transistor $Q_{17}$.

In the case where the ghost is in the phase opposite to that of the signal to be received, by contrast, the base potential of the transistor $Q_{11}$ is reduced by the amount of the ghost, so that $i_{11} < (i_{12}/2)$ and hence $i_{10} > (i_{12}/2)$ when the transistor $Q_{12}$ is on. As a result, the charges $|(i_{11} - i_{10})|$ flows out of the capacitor $C_2$. The voltage across the capacitor $C_2$ is thus reduced, so that the emitter voltage of the transistor $Q_{15}$ becomes lower than that of the transistor $Q_{17}$.

In this way, the emitter voltage of the transistor $Q_{15}$ becomes higher or lower than that of the transistor $Q_{17}$, depending on the polarity of the ghost, and therefore a signal with desired characteristics may be produced by controlling the polarity and gain control device 2 by the use of these two voltages.

In the polarity and gain control device 2, the transistor $Q_7$ is for providing a constant current source, and the current $I_0$ flows through the transistor $Q_7$. The transistor $Q_5$ and transistor $Q_6$ make up a differential pair. The input signal $V_{in}$ applied from the terminal 16 is proportonal to the current $i_5$ flowing in the transistor $Q_5$, less the current $I_0/2$.

$$i_5 - (I_0/2) = k_1 V_{in} \tag{3}$$

On the other hand, let the current flowing in the transistor $Q_6$ be $i_6$.

$$i_6 = I_0 - i_5 \tag{4}$$

Also assume that the currents $i_1$, $i_2$, $i_3$ and $i_4$ flow in the transistors $Q_1$, $Q_2$, $Q_3$ and $Q_4$ respectively and that the voltage applied to the transistors $Q_2$ and $Q_3$ less the voltage applied to the transistors $Q_1$ and $Q_4$ is V. In view of the fact that the transistors $Q_1$ and $Q_2$ make up a differential pair and the transistors $Q_3$ and $Q_4$ another differential pair, the relations mentioned below are obtained.

$$i_1 = (1 - k_2)i_5 \tag{5}$$

$$i_2 = k_2 i_5 \tag{6}$$

$$i_3 = k_2 i_6 \tag{7}$$

$$i_4 = (1 - k_2)i_6 \tag{8}$$

$$0 < k_2 < 1 \tag{9}$$

where $k_2$ is a constant determined by the voltage difference V and. The currents $i_2$ and $i_4$ flow in the load resistor $R_L$. The output $V_{out}$ is therefore $$\begin{aligned} V_{out} &\propto -[k_2 i_5 + (1 - k_2) i_6] \\ &= -k_2 i_5 - (1 - k_2)(I_0 - i_5) \\ &= -(1 - k_2) I_0 - (2k_2 - 1)i_5 \\ &= -(2k_2 - 1)\left[\frac{i_5 - I_0}{2}\right] - \frac{I_0}{2} \end{aligned}$$

As a result, by eliminating the DC component $I_0/2$, it will be easily understood from the equation (3) that $$V_{out} = -(2K_2 - 1) k_1 V_{in} \tag{11}$$

From equation (9), $$-1 < (2k_2 - 1) < 1 \tag{12}$$

In other words, when the voltage difference V is positive, $(2k_2 - 1)$ is larger than zero and the output voltage $V_{out}$ is out of phase with the input voltage $V_{in}$. When the voltage difference V is reduced, the output is accordingly reduced. When the voltage difference V becomes zero, $(2k_2 - 1) = 0$ and no output is produced at all. When the voltage difference becomes negative, $(2k_2 - 1) < 0$, so that the output voltage $V_{out}$ becomes in phase to the input voltage $V_{in}$. In this way, not only the gain is controlled but also the polarity may be switched at the same time.

It will be seen from the foregoing description that according to the present invention, the polarity and amplitude of the ghost-suppression delay signal are automatically controlled, thus facilitating the operation of the television set as a whole. This is very advantageous in view of the fact that if not automated this way, manual adjustment is required each time of switching the channel since different channels have different ghost polarities and amplitudes.

The ghost delay time is sometimes different with the channel. In such a case, the conventional system requires the adjustment of the delay time and the polarity and amplitude. This compares with the present invention in which only the delay time is required to be adjusted, thus facilitating greatly the adjusting operation as a whole.

Although both the polarity and amplitude are adjusted automatically in the preceding embodiment, the invention may of course be so constructed as to automatically adjust selected one of polarity and amplitude.

The preceding embodiments of the automatic ghost-suppression system according to the present invention explained with reference to FIGS. 1 to 9 above are suitable for suppressing mainly the ghost of the brightness signal. The automatic ghost-suppression system according to the invention suitably used for eliminating the ghost of a color signal will be explained below.

Figure 10:
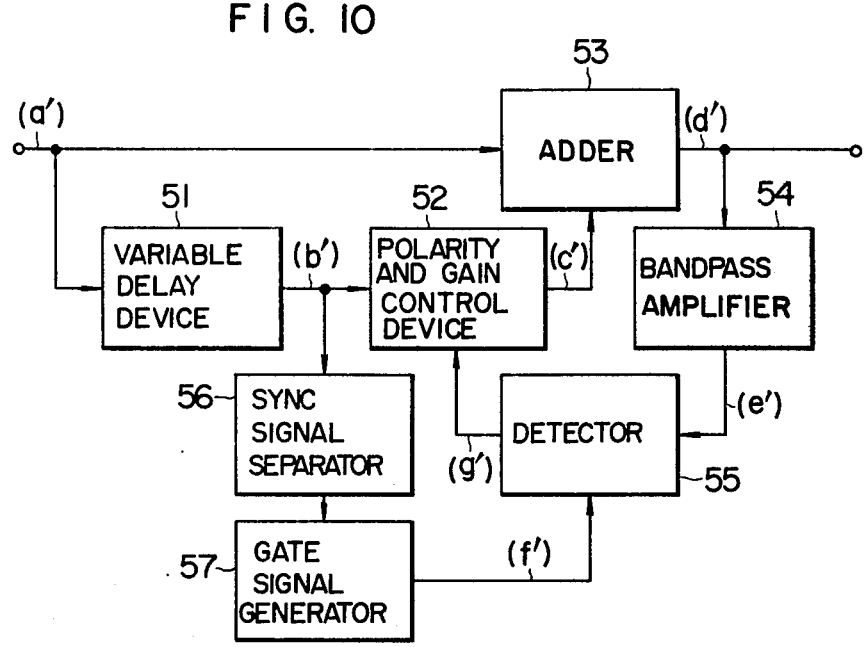
FIG. 10 is a block diagram showing a further embodiment of the automatic ghost-suppression system according to the present invention.

FIG. 10 shows another embodiment of the automatic ghost-suppression system according to the invention. In this figure, reference numeral 51 designates a variable delay device for delaying part of the received signal, numeral 52 a polarity and gain control device for adjusting the polarity and amplitude of the signal delayed by the variable delay device 51, numeral 53 a adder for adding the delayed signal the polarity and amplitude of which have been adjusted by the polarity and gain control device 52, with the original signal, numeral 54 a bandpass amplifier for picking up the color signal from the output signal of the adder 53, numeral 55 a detector for selectively detecting the residual ghost of the burst signal in the vertical blanking period out of the sampled color signal and for controlling the polarity and gain control device 52 by the output thereof, and numeral 56 a sync signal separator for separating a sync signal from the signal delayed by the variable delay device 51. Numeral 57 designates a gate signal generator for generating a gate signal for sampling the residual ghost component of the burst signal in the vertical blanking period out of the color signal detected by the bandpass filter, in response to the sync signal separated by the sync signal separator 56. The waveforms produced at the respective parts shown in FIG. 10 are illustrated in FIG. 11. The waveforms of FIG. 11, however, are associated with only those in the vertical blanking period including horizontal sync pulses and a burst signal after the equalizing signals. The operation of the respective parts of the circuit of FIG. 10 will be explained below with reference to FIG. 11.

Assume that a signal including a ghost such as shown in (a') of FIG. 11 is received. The delay time of the variable delay device 51 is adjusted to the length equal to the delay time of the ghost, and part of the input signal (a') of FIG. 11 is delayed as shown in (b') of FIG. 11. The polarity and amplitude of this delayed signal are adjusted by the polarity and gain control device 52. Now, assume that such an adjustment is not effected properly. The polarity and gain control device 52 produces an output as shown in (c') of FIG. 11. The signal (c') of FIG. 11 is added with the original input signal (a') in the adder 53 of FIG. 10, which adder 53 produces thereupon the residual ghost as shown in (d') of FIG. 11. From this output signal of the adder 53, the color signal is selectively picked up by the bandpass amplifier 54 and changes to a signal as shown in (e') of FIG. 11. Out of this color signal (e') of FIG. 11, only the part thereof including the residual ghost component of the burst signal in the vertical blanking period is sampled and detected by the gate signal (f') of FIG. 11 generated by the gate signal generator 57. If the residual ghost exists, therefore, the output voltage of the detector 55 changes from V to V', thus controlling the polarity and gain control device 52 to further increase the output thereof. This operation continues until the residual ghost has substantially disappeared and the output of the detector 55 undergoes no change. When the residual ghost is substantially eliminated, the operation is settled.

Figure 12:
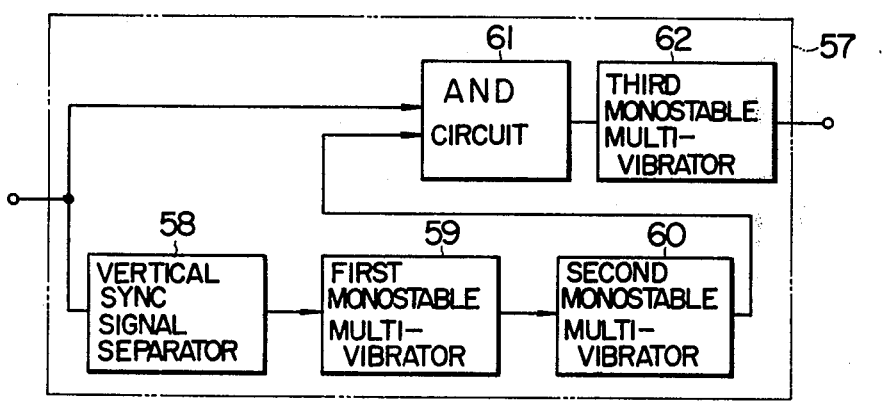
FIG. 12 is a block diagram showing an embodiment of the gate signal generator used in the circuit of FIG. 10.

The generator of the gate signal (f') of FIG. 11 will be explained below. The block diagram of FIG. 12 shows a gate signal generator 57. Numeral 58 designates a vertical sync signal separator circuit for separating a vertical sync signal from the sync signal of the delayed signal which has been separated by the sync signal separator 56 shown in FIG. 10. Numeral 59 designates a first monostable multivibrator the output of which rises when the output of the vertical sync signal separator circuit 58 exceeds a predetermined level. Numeral 60 designates a second monostable multivibrator the output of which rises in response to the fall of the output of the first monostable multivibrator 59. Numeral 61 designates an AND circuit which produces a logical product of the output of the second monostable multivibrator 60 and the output of the sync signal separator 56 in FIG. 10. Numeral 62 designates a third monostable multivibrator the output of which rises in response to the fall of the output of the AND circuit 61.

Figure 13:
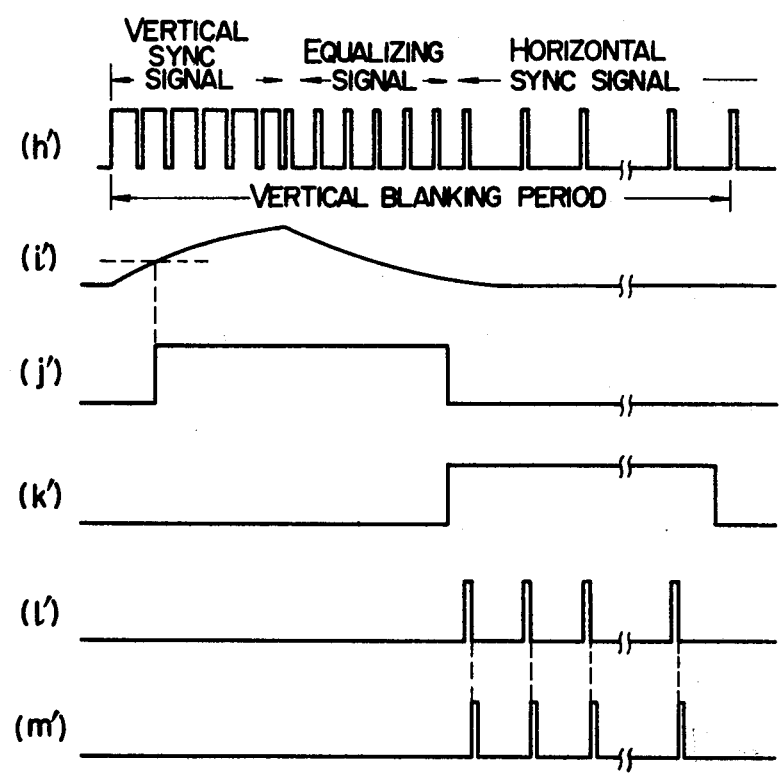
FIG. 13 shows waveforms produced at the essential parts of the system according to the invention for explaining the block diagram of FIG. 12.

The operation of the circuit of FIG. 12 will be explained below with reference to the waveforms produced at the respective parts shown in FIG. 13. The output signal separated by the sync signal separator 56 in FIG. 10 takes the form as shown in (h') of FIG. 13. In other words, the sync signal separator 56 is so constructed as to produce only a sync signal in response to the peak of the sync signal, and therefore the ghost with a small amplitude is not sampled. Thus the sync signal without any ghost as shown in (h') of FIG. 13 is produced. Part of this signal is low-pass filtered in the vertical sync signal separator circuit 58, and assumes the form as shown in (i') of FIG. 13. The first monostable multivibrator 59 is so constructed that the output signal thereof rises when the output signal of the vertical sync signal separator circuit 58 exceeds a predetermined level, and falls before the horizontal sync signal begins to appear, so that the first monostable multivibrator 59 produces an output signal as shown in (j') of FIG. 13. The second monostable multivibrator 60 is so constructed that the output signal thereof rises in response to the fall of the output of the first monostable multivibrator 59, and falls before the end of the vertical blanking period, so that the second monostable multivibrator 60 produces an output as shown in (k') of FIG. 13.

The signal shown in (k') of FIG. 13 is a pulse which keeps its rise position during the section involving the horizontal sync signal in the vertical blanking period. By applying the output of the second monostable multivibrator 60 and the output of the sync signal separator 56 to an AND circuit, therefore, the horizontal sync pulses as shown in (l') of FIG. 13 in the vertical blanking period are separated. These horizontal sync pulses are those for the delayed signal as shown in (b') of FIG. 11. As seen from (b') of FIG. 11, the horizontal sync pulses during the vertical blanking period are immediately followed by a burst signal, and therefore coincide with the time period involving the residual ghost as shown in (a') of FIG. 11. Therefore, if the pulse as shown in (m') of FIG. 13 which rises with the fall of the output pulse of the AND circuit 61 and continues for the period involving the burst signal is generated by the third monostable multivibrator 62, that particular pulse makes up the gate pulse (f') of FIG. 11 for sampling the residual burst signal in the vertical blanking period shown in (d') of FIG. 11.

Next, the detector 55 shown in FIG. 10 will be explained. This detector 55, as will be described later again, is required to have the ability to discriminate also the phase of the residual burst signal. Assume for example that the magnitude of the ghost-suppressing signal (c') of FIG. 11 increases beyond the ghost of (c') of FIG. 11. The burst signal persistent in the output of the bandpass amplifier 54 of FIG. 10 is not different from the residual burst signal (e') of FIG. 11, except for phase. If the output of the bandpass amplifier 54 is detected only by the envelope thereof, therefore, the phase information is overlooked, so that the output signal similar to (e') of FIG. 11 is produced, thereby further increasing the magnitude of the output of the polarity and gain control device 52 as a control signal. As a result, when the ghost-suppression signal increases beyond the ghost itself, the ghost-suppression signal further increases to such a degree where the ghost is no longer controllable. It is thus necessary to effect a control operation when the ghost-suppression signal is larger than the ghost, in the way opposite to when it is smaller than the ghost. The only means making this possible is by the use of the phase of the residual burst signal.

In other words, the detector 55 must be such that the output of the polarity and gain control device 2 is increased when the phase of the burst signal ((e') of FIG. 11, for instance) is identical to the phase of the burst signal of the ghost ((a') of FIG. 11, for instance), and vice versa.

Figure 14:
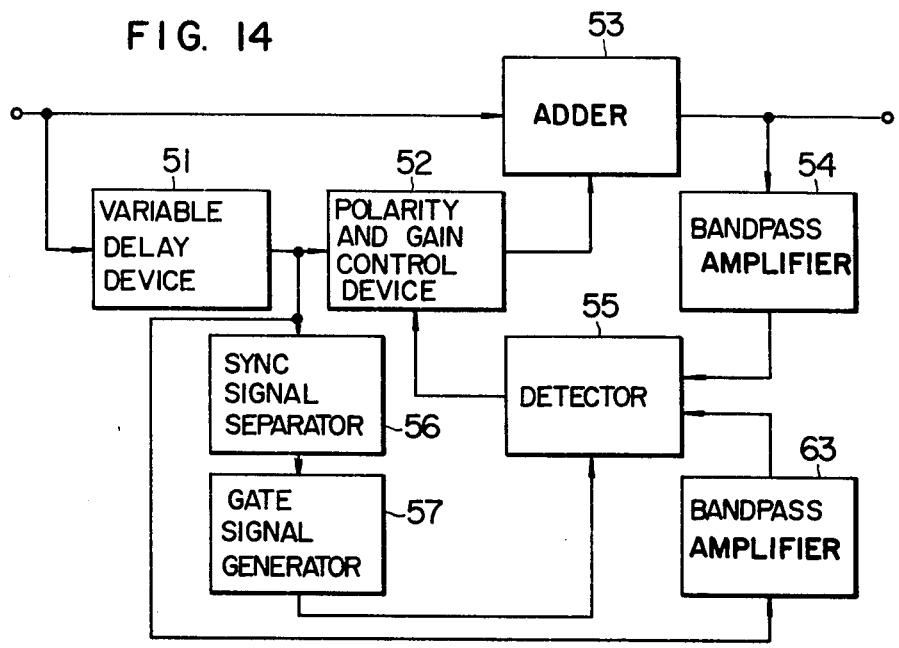
FIGS. 14, 15 and 16 are block diagrams showing still other embodiments of the automatic ghost-suppression system according to the invention.

To perform this operation, the persistent burst signal is synchronously detected with a signal in phase with the ghost of the burst signal as a reference signal. As will be easily seen by comparison between the signals (b') and (a') of FIG. 11, if the delay time of the variable delay device 51 is properly set, the burst signal of the signal delayed by the variable delay device 51 is in phase with the burst signal of the ghost. Therefore, this burst signal of the delayed signal is conveniently used as a reference signal. Preferably, therefore, as shown in FIG. 14, part of the output of the variable delay device 51 is applied to the detector 55 through the bandpass amplifier 63 which detects the burst signal selectively from the delayed signal, while the output of the bandpass filter 54 is applied to the detector 55. Thus the detector 55 is used as a synchronous detector.

Figure 15:
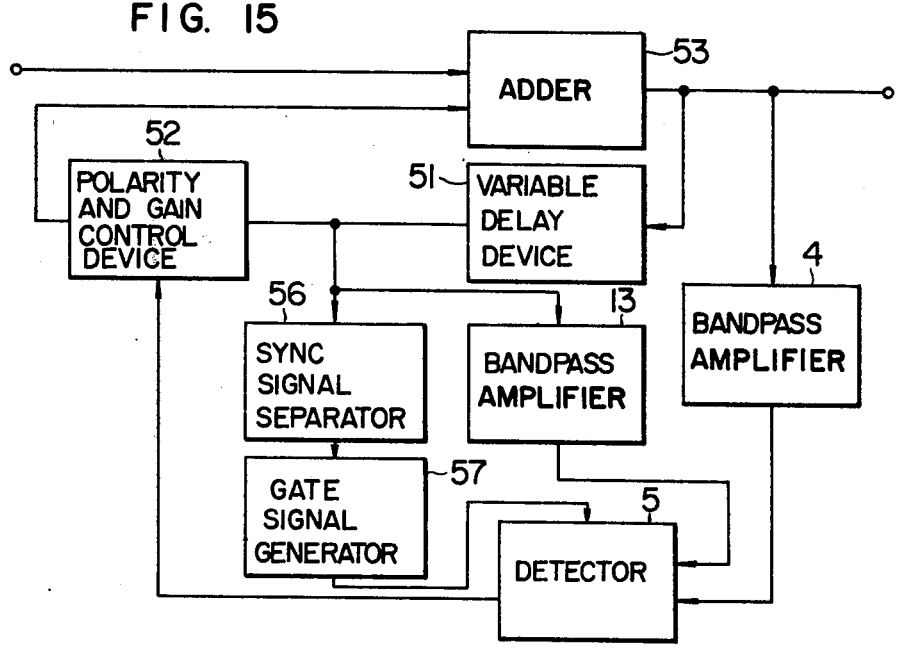

Still another embodiment of the invention as applied to the feedback type ghost-suppression system is shown in FIG. 15. In FIG. 15, like component elements are denoted by like reference numerals in FIG. 14. In this feedback type ghost-suppression system, a ghost-suppression delayed signal is taken from the output of the adder 53 and the ghost in the ghost-suppression delayed signal is already eliminated, thus generally making possible more smooth elimination of the ghost than the configuration of FIG. 10. The operation of the circuit of FIG. 15 will be easily understood from the explanation of FIG. 10 and will not be repeated.

In some cases a color ghost is more conspicuous. In such a case, the ghost-suppression system as shown in FIG. 16 is used effectively.

Figure 16:
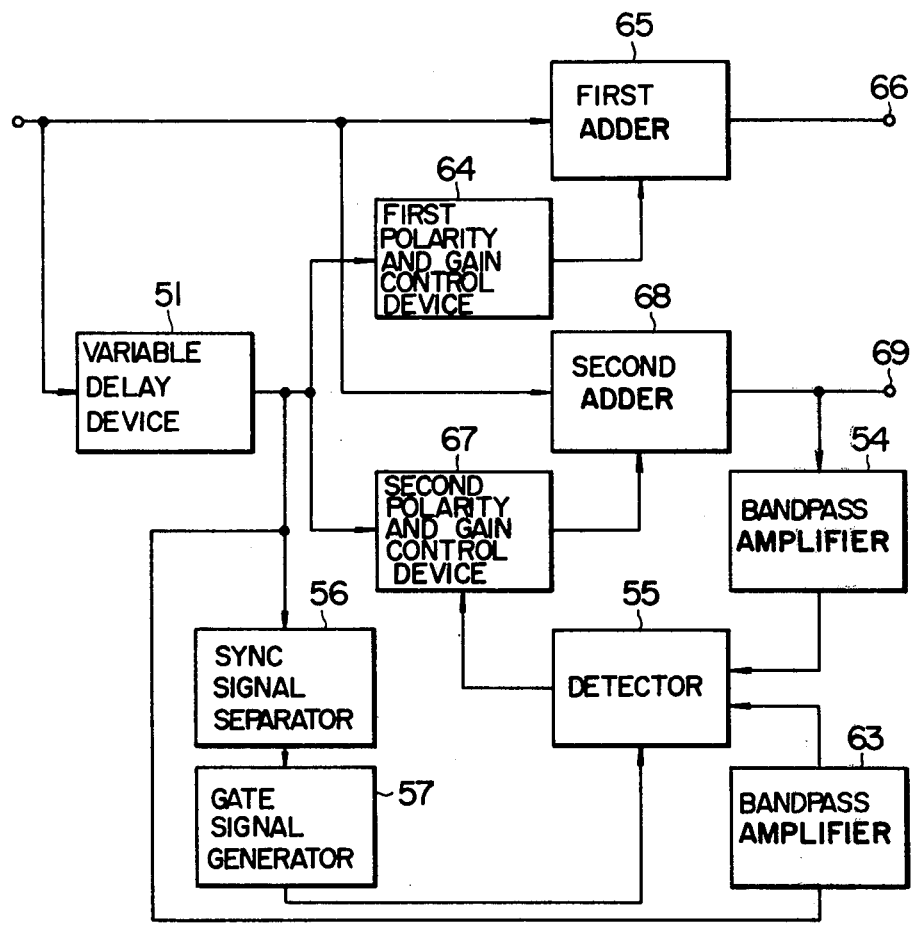

The feature of the circuit of FIG. 16 lies in that the polarity and gain control device and the mixer are provided for each of the brightness signal processing system and the color signal processing system. Numeral 64 designates a polarity and gain control device for the brightness signal system, numeral 65 a mixer for the same system, numeral 66 an output terminal leading to the circuit of the same system, numeral 67 a polarity and gain control device for the color signal system, numeral 68 a mixer of the same system, and numeral 69 an output terminal leading to the same system. In the case where only the color ghost is conspicuous, only the polarity and gain control device 67 for the color signal system is adjusted. In this way, the brightness signal processing system is not affected in suppressing the color ghost. In the case of the ghost as shown in (a') of FIG. 11, the outputs of the polarity and gain control devices 64 and 67 are adjusted substantially equally.

In the circuit of FIG. 16, the delay time of the variable delay device 51 is set at such a length as to most effectively suppress the color component of the ghost, and then the polarity and amplitude of the polarity and gain control device 64 for the brightness signal processing system is manually adjusted in such a manner as to achieve the most effective ghost suppression. In this way, the ghost is eliminated. This adjusting operation is also easier according to the present invention than when the invention is not used. For further facilitating the adjusting operation, the ghost-suppression system as shwon in FIG. 1 is preferably inserted in the path of the brightness signal. In other words, by connecting the variable delay device, the sync signal separator, the gate signal generator and the detector as shown in FIG. 1, it is possible to suppress the ghosts of the color signal and the brightness signal at the same time automatically.

According to the preceding embodiment, it will thus be understood that the residual burst signal of the ghost mixed in the received signal is detected and the detected output is used to automatically control the polarity level of the ghost-suppression delayed signal, thereby greatly facilitating the adjusting process. In these embodiments, the color ghost is eliminated especially effectively.

I claim:

1. An automatic ghost-suppression system comprising:

variable delay means for delaying a video signal in accordance with a delay time of a ghost;

polarity and gain control means for adjusting the polarity and amplitude of the video signal delayed by said variable delay means;

adder means for adding said video signal not delayed with the output from said polarity and gain control means to suppress the ghost therein;

synchronizing signal separator means for separating a synchronizing signal from said delayed video signal;

gate signal generator means for generating a gate signal in response to said synchronizing signal separated by said synchronizing signal separator means in order to sample any residual ghost in the vertical blanking period out of said video signal produced at the output of said adder means;

detector means for detecting the residual ghost in the vertical blanking period contained in said video signal produced by said adder in response to said gate signal generated by said gate signal generator; and means for controlling the polarity and gain of said polarity and gain control means in response to the output signal of said detector means.

2. An automatic ghost-suppression system according to claim 1, in which said gate signal generator means includes a vertical synchronizing signal separator circuit means for separating a vertical synchronizing signal from said synchronizing signal separated by said synchronizing signal separator means, first monostable multivibrator means reversed when the output signal of said vertical synchronizing signal separator circuit means exceeds a predetermined voltage level, and restored to the original condition when the vertical synchronizing signal period has passed, second monostable multivibrator means reversed when said first monostable multivibrator means is restored to the original condition, and restored to the original condition before the start of the video period, and an AND circuit means to which the output of said second monostable multivibrator means and the synchronizing signal separated by said synchronizing signal separator means are applied.

3. An automatic ghost-suppression system according to claim 1, in which said gate signal generator means includes a vertical synchronizing signal separator circuit means for separating a vertical synchronizing signal from said synchronizing signal separated by said synchronizing signal separator means, first monostable multivibrator means reversed when the output signal of said vertical synchronizing signal separator circuit means exceeds a predetermined voltage level, and restored to the original condition when the vertical synchronizing signal period has passed, second monostable multivibrator means reversed when said first monostable multivibrator means is restored to the original condition, and restored to the original condition before the start of the video period, first AND circuit means to which the output of said second monostable multivibrator means and the synchronizing signal separated by said synchronizing signal separator means are applied, third monostable multivibrator means reversed in response to the output signal of said first AND circuit means and restored to the original condition within a shorter time than the duration of the horizontal synchronizing signal, and second AND circuit means to which the output signal of said third monostable multivibrator means and the output signal of said first AND circuit means are applied.

4. An automatic ghost-suppression system according to claim 1, in which said gate signal generator means includes vertical synchronizing signal separator circuit means for separating a vertical synchronizing signal from said synchronizing signal separated by said synchronizing signal separator means, first monostable multivibrator means reversed when the output signal of said vertical synchronizing signal separator circuit means exceeds a predetermined voltage level, and restored to the original condition when the vertical synchronizing signal period has passed, second monostable multivibrator means reversed when said first monostable multivibrator means is restored to the original condition, and restored to the original condition before the start of the video period, AND circuit means to which the output of said second monostable multivibrator means and the synchronizing signal separated by said synchronizing signal separator means are applied, and third monostable multivibrator means reversed in response to the fall of the output pulse of said AND circuit means and restored to the original condition within a predetermined time.

5. An automatic ghost-suppression system according to claim 1, wherein said gate signal generator means includes means for generating a gate signal only from the horizontal synchronizing signal in the vertical blanking period out of the synchronizing signal separated by said synchronizing signal separator means.

6. An automatic ghost-suppression system comprising:

variable delay means for delaying a video signal in accordance with a delay time of a ghost;

polarity and gain control means for adjusting the polarity and the amplitude of said delayed video signal;

adder means for adding the output signal of said polarity and gain control means with said video signal not delayed thereby suppressing the ghost;

synchronizing signal separator means for separating a synchronizing signal from the output signal of said variable delay means;

gate signal generator means for generating a gate signal by the use of the horizontal synchronizing signal in the vertical blanking period out of the synchronizing signal separated by said synchronizing signal separator means;

first monostable multivibrator means reversed in response to the fall of said gate signal and restore to the original condition within a predetermined time;

second monostable multivibrator means reversed in response to the fall of the output pulse of said first monostable multivibrator means and restore to the original condition within a predetermined time, said second monostable multivibrator means producing a pedestal-clamping pulse at the output thereof;

pedestal clamp circuit means for sampling the pedestal portion of the vertical blanking period of the video signal obtained from the output of said adder means in response to the output pulse of said second monostable multivibrator means thereby clamping the pedestal level of said video signal at a predetermined potential;

detector means for detecting the residual ghost signal in the vertical blanking period contained in the output signal of said pedestal clamp circuit means in response to the gate signal produced by said gate signal generator means; and means for controlling the polarity and the gain of said polarity and gain control means in response to the output signal of said detector means.

7. An automatic ghost-suppression system comprising:

variable delay means adapted for delaying a video signal in accordance with a delay time of a ghost;

polarity and gain control means for adjusting the polarity and the amplitude of the delayed video signal;

adder means for adding the output signal of said polarity and gain control means with said video signal not delayed;

synchronizing signal separator means for separating a synchronizing signal from the output signal of said variable delay means;

gate signal generator means for generating a gate signal for detecting the residual ghost of the burst signal by the use of the horizontal synchronizing signal in the vertical blanking period out of the synchronizing signal separated by said synchronizing signal separator means;

bandpass circuit means for sampling only a color signal from the output signal of said adder means;

detector means for detecting the residual ghost of the burst signal in the vertical blanking period contained in the output signal of said bandpass circuit means in response to said gate signal; and means for controlling the polarity and the gain of said polarity and gain control means in response to the output signal of said detector means.

8. An automatic ghost-suppression system comprising:

variable delay means for delaying a video signal in accordance with the delay time of a ghost;

polarity and gain control means for adjusting the polarity and the amplitude of the delayed video signal;

adder means for adding the output signal of said polarity and gain control means with said video signal not delayed;

synchronizing signal separator means for separating a synchronizing signal from the output signal of said variable delay means;

gate signal generator means for generating a gate signal for detecting the residual ghost of the burst signal contained in said video signal by the use of the horizontal synchronizing signal in the vertical blanking period out of the synchronizing signal separated by said synchronizing signal separator means;

first bandpass means for passing only a color signal from the output signal of said adder means;

second bandpass means for passing only a color signal from the output signal of said delay means;

synchronous detector means for synchronously detecting the residual ghost of the burst signal in the vertical blanking period contained in the output signal of said first bandpass means with the output from said second bandpass means in response to said gate signal; and means for controlling the polarity and gain of said polarity and gain control means in response to the output signal of said detector means.

9. An automatic ghost-suppression system comprising:

adder means for receiving a video signal at one of its inputs;

variable delay means for delaying the video signal output from said adder means in accordance with the delay time of a ghost;

polarity and gain control means for adjusting the polarity and the amplitude of the delayed video signal, the output from said polarity and gain control means being applied to another input of said adder means to be added to the video signal not delayed;

synchronizing signal separator means for separating a synchronizing signal from the output signal of said variable delay means;

gate signal generator means for generating a gate signal for detecting the residual ghost of the burst signal by the use of the horizontal synchronizing signal in the vertical blanking period out of the synchronizing signal separated by said synchronizing signal separator means;

first bandpass means for passing only a color signal from the output signal of said adder means;

second bandpass means for passing only a color signal from the output signal of said delay means;

synchronous detector means for synchronously detecting the residual ghost of the burst signal in the vertical blanking period contained in the output signal of said first bandpass means with the output from said second bandpass means in response to said gate signal; and means for controlling the polarity and gain of said polarity and gain control means in response to the output signal of said detector means.

10. An automatic ghost-suppression system comprising:

variable delay means for delay a video signal in accordance with a delay time of a ghost;

first polarity and gain control means for adjusting the polarity and the amplitude of the delayed video signal;

first adder means for adding the output signal of said first polarity and gain control means with said video signal not delayed;

synchronizing signal separator means for separating a synchronizing signal from the output signal of said delay means;

gate signal generator means for generating a gate signal for detecting the residual ghost of the burst signal by the use of the horizontal synchronizing signal in the vertical blanking period out of the synchronizing signal separated by said synchronizing signal separator means;

first bandpass means for passing only a color signal from the output signal of said first adder means;

second bandpass means for passing only a color signal from the output signal of said delay means;

synchronous detector means for synchronously detecting the residual ghost of the burst signal in the vertical blanking period contained in the output signal of said first bandpass means with the output from the second bandpass means in response to said gate signal;

means for controlling the polarity and gain of said first polarity and gain control means in response to the output signal of said detector means;

second polarity and gain control means for adjusting the polarity and the amplitude of the delayed video signal; and second adder means for adding the output signal of said second polarity and gain control means with said video signal not delayed in order to suppress any ghost in the brightness signal.

* * * * *